United States Patent [19]

Jass

[11] Patent Number: 5,396,567

[45] Date of Patent: Mar. 7, 1995

[54] PROCESS FOR ADAPTIVE QUANTIZATION FOR THE PURPOSE OF DATA REDUCTION IN THE TRANSMISSION OF DIGITAL IMAGES

[75] Inventor: Wieland Jass, Baldham, Germany

[73] Assignee: Siemens Aktiengesellschaft, Munich, Germany

[21] Appl. No.: 50,454

[22] PCT Filed: Nov. 4, 1991

[86] PCT No.: PCT/EP91/02080

§ 371 Date: May 13, 1993

§ 102(e) Date: May 13, 1993

[87] PCT Pub. No.: WO92/09173

PCT Pub. Date: May 29, 1992

[30] Foreign Application Priority Data

Nov. 16, 1990 [EP] European Pat. Off. ......... 90121969.1

[51] Int. Cl.$^6$ ............................................. C06K 9/36
[52] U.S. Cl. ..................... 382/56; 348/405; 348/420; 258/433
[58] Field of Search ........... 382/56, 50; 358/133, 358/426, 430, 432, 433, 427, 384, 405, 420; H04N 1/415

[56] References Cited

U.S. PATENT DOCUMENTS

| | | | |
|---|---|---|---|
| 4,677,479 | 6/1987 | Hatori et al. | 382/50 |
| 5,021,891 | 6/1991 | Lee | 382/41 |
| 5,101,280 | 3/1992 | Moronega et al. | 358/426 |
| 5,241,395 | 8/1993 | Chen | 382/56 |

FOREIGN PATENT DOCUMENTS

| | | |
|---|---|---|
| 0246701 | 11/1987 | European Pat. Off. . |
| 3414982 | 10/1985 | Germany . |
| 3511713 | 10/1986 | Germany . |
| 3940554 | 6/1990 | Germany . |
| WO8810544 | 12/1988 | WIPO . |

OTHER PUBLICATIONS

Gimlett, Use of "Activity" Classes in Adaptive Transform Image Coding, IEEE Transactions on Communications Technology, Jul. 1975, pp. 785–786.

"Video Bit-rate Reduction Through Psychovisual Compression", by David L. McLaren et al, Australian Video Communications Workshop, Melbourne, Jul. 9–11, 1990, pp. 247–254.

"Interlaced and Progressive HDTV-Coding—A Comparison for 140 MBIT/S—Transmission", by Walter Tengler, Australian Video Communications Workshop, Melbourne, Jul. 9–11, 1990, pp. 7–18.

Primary Examiner—Joseph Mancuso
Attorney, Agent, or Firm—Hill, Steadman & Simpson

[57] ABSTRACT

A process for adaptive quantization with quantization errors which have little disturbing visual effects, using a digital block-related process for data reduction in digital images or image sequences. It is provided in this process that an image to be transmitted is subdivided into a multiplicity of blocks, and that there is calculated for each block a parameter for setting the quantization assigned to this block. The calculation of this parameter is performed in this case with the aid of a subdivision of each block into subregions, there being calculated for each subregion an activity measure with the aid of which a quantization parameter is determined for each subregion. Finally, the quantization parameters of all subregions are summed up within the blocks in the case of all blocks and multiplicatively scaled.

8 Claims, 4 Drawing Sheets

PROCESS FOR ADAPTIVE QUANTIZATION FOR THE PURPOSE OF DATA REDUCTION IN THE TRANSMISSION OF DIGITAL IMAGES

BACKGROUND OF THE INVENTION

A conventional mode of procedure in data reduction for the purpose of the transmission of digital images or digital sequences is the subdivision of image regions into smaller regions, so-called blocks (FIG. 2). These blocks are typically 8—8 or 16—16 pixels (picture elements) in size (FIG. 3). Examples of such block-related processes for image coding are the so-called transformation processes, of which the most frequently applied representative is the so-called discrete cosine transformation (D.C.T.). Signal flow diagrams for coding processes of this type for individual images or image sequences are represented in FIGS. 1a and 1b.

The purpose of coding is data reduction, by means of which digital transmission of images or image sequences only becomes possible in many instances. A known principle in this regard is the so-called redundancy reduction, in which statistic characteristics of the image signals are utilized for data reduction. The sole use of redundancy reduction guarantees the complete reconstructability of the image information from the coded data. However, with the aid of redundancy reduction alone it is normally possible to achieve only a data compression by factors of 2 to 3. In most applications of image coding and image sequence coding, however, there is a need for higher compression factors, for example at least a compression factor of 7 in the case of high definition television (HDTV). In order to achieve such compression factors and higher, such as in the case of videophone, it is also necessary to use methods of irrelevance reduction. However, in this case the original signal information is partially lost and image transmission errors are produced. The aim is, however, for these image errors not to be visible to a viewer or to disturb as little as possible.

In a transformation coding, redundancy reduction and irrelevancy reduction are generally applied jointly to the signal values in the transformation region of an image block (A. N. Netravali, W. G. Haskell: "Digital pictures, representation and compression" Plenum Press, New York, 1988). In DCT, these are the so-called DCT coefficients. Typical modes of procedure in irrelevance reduction are, on the one hand, simply to leave out entire subsets of DCT coefficients, and on the other hand to quantize the remaining, significant coefficients more coarsely, that is to say to represent them in a coarser raster of values than originally assigned to them. A raster of values can be characterized by a parameter Q for its fineness. The larger the Q, the coarser the raster. In a so-called linear quantization, this parameter is simply the quantization step width, that is to say the uniform interval between two adjacent raster values. Different types of quantization of DCT coefficients are known. In some processes, the individual coefficients are quantized differently in terms of fineness. The different finenesses are derived in this case from assumptions concerning the visual significance of the coefficients. Such a process is described, for example, in D. McLaren, D. T. Nguyen: "Video bitrate reduction through psychovisual impression", Proc. 1990 Video Communications Workshop, Melbourne, 9 to 11 Jul. 1990. In another process, all coefficients of equal fineness are quantized, as is described, for example, in W. Tengler, W. Jaβ: "Interlaced and Progressive HDTV-Coding, a Comparison for 140 Mbit/s- Transmission" Proceedings 1990 Austr. Video Communication Workshop Melbourne, 9 -11 Jul. 1990.

Different types of quantization generate different types of image errors. In the case of a transformation such as DCT, however, these image errors are generally distributed in each case over an entire block in the image region, irrespective of the quantization scheme employed. Whether these errors are either not visible at all or are more or less disturbing visually, depends on the original image content, on the one hand, and on the mean amplitude of the errors in a block, on the other hand. This mean error amplitude is directly connected to the previously mentioned quantization parameter Q for a block. The larger Q is set, the smaller the data rate required for coding a block, but also the larger in general the mean error amplitude.

In advanced processes for coding individual images and image sequences, the quantization parameter Q is now adapted per block to the image content in such a way that given the observance of specific limits for the resulting data rate the image errors disturb visually as little as possible. In this case, the image content in a block is analyzed and the quantization parameter Q is set as a function of the result of the analysis. This analysis can be undertaken either on pixel blocks, that is to say on blocks of picture elements, or on blocks of DCT coefficients. Analysis methods which analyze blocks of picture elements are, for example, classified in the publications of McLaren (McLaren 1990) and Tengler (Tengler 1990). However, these publications do not go into the possible defects of the adaptive quantization processes described there, which are improved by means of the process according to the invention.

The general mode of procedure of the analysis methods described in the publications by McLaren and Netravali is to be described briefly below in order to be able for the purpose of describing the present invention to have recourse to the terms and notations thereby introduced. In the analysis methods already known, a so-called activity measure is firstly calculated from the image signal values of all the pixels in a block. The magnitude of this activity measure is directly proportional to the intensity of the mean amplitude fluctuation of the image signal values of all the pixels of the block under consideration. In the article by Tengler and Jasz, use is made, for example, as the activity measure A of the sum of absolute local image signal differences (FIG. 3):

$$A = \sum_{m=1}^{M} \sum_{n=1}^{N} (|y(m,n+1) - y(m,n)| + |y(m+1,n) - y(m,n)|) \quad (1)$$

where y(m, n) : image signal value of the pixel with the index m, n, m: row index, n: column index in the block, and M,N: block side lengths, for example 8 or 16.

A preliminary parameter P is taken as a function of the activity measure calculated in this way, for example from a table:

$$P = Q_0(A). \quad (2)$$

The quantization parameter Q actually applied for a block is, finally, obtained from P through multiplication by a scale factor $F_Q$:

(2') $Q = F_Q \cdot P$ $F_Q$ is a factor which is derived from the occupancy of a data buffer (FIG. 1b) for controlling the observation of rate limitations. An example of a function $Q_0(A)$ is described in the publication by W. Tengler 1990, for example, and represented graphically in FIG. 4.

The adaptive quantization scheme described in the article by W. Tengler leads to a good image quality even in the case of not too strict secondary conditions on the magnitude of the resulting data rate. In the case of specific image contents, however, image errors produced by the quantization can become visible. Typical of such image contents is that a block can contain both regions of high activity, that is to say with fine high-contrast details, and regions of low activity, that is to say with only weakly varying image content.

Setting the quantization parameter is, however, now optimized with respect to the required data rate and with the aim of avoiding image errors on the assumption that the activity in a block is relatively uniformly distributed. The higher the activity, the larger the image errors may then be without becoming disturbingly visible, that is to say the larger the quantization parameter may be set for reducing the data rate. In the type of process assumed here for coding digital images or image sequences, however, the image errors are generally uniformly distributed over a block by the quantization. Consequently, the quantization parameter set for the entire block can lead to image errors which although not becoming disturbingly visible in the parts of the block of higher activity can, however, become so in those of lower activity.

SUMMARY OF THE INVENTION

It is the object of the present invention to avoid these disadvantages of the known processes which have been described. In order to achieve this object, a process for data reduction in the transmission of digital images or image sequences is provided as follows according to the present invention. The process of the present invention for adaptive quantization for the purpose of data reduction in the transmission of digital images has the following steps: a) an image region to be transmitted is subdivided into a multiplicity of blocks; b) each block is subdivided into subregions $E(l)$, where $l = 1, \ldots, L$; c) an activity measure $A(l)$ is determined for each subregion $E(l)$; d) a parameter $P(l)$ is determined for each subregion $E(l)$ from the activity measure $A(l)$ with the aid of a function $Q_0$ in accordance with the relationship $P(l) = Q_0(A(l))$, e) by summing over all the subregions $E(l)$ of each block a parameter $$P = \sum_l P(l)$$

characteristic of each block is calculated, f) a quantization parameter $Q = (F_Q/L) \cdot P$ is determined for each block from the parameter P with the aid of a scaling factor $F_Q$, and g) the image region to be transmitted is subjected in blockwise fashion to a transformation, transformation coefficients being determined which are quantized for each block as a function of the value of the quantization parameter Q belonging to the respective block.

According to the invention, in order to determine the quantization parameter Q a block in the image region is itself again subdivided into a number L of smaller subregions $E(l)$ (FIG. 5). These subregions are denoted by a number $l := 1, \ldots L$. As previously for an entire block, an activity measure $A(l)$ is calculated for each subregion $E(l)$ as the sum of absolute local pixel value differences between horizontally and vertically adjacent pixels:

(3) $A = \Sigma \ (/y(m,n+1) - y(m,n)$
$/ + /y(m+1,n) - y(m,n) /)$.

$m,n \in E(l)$

The difference operation requires at the rim of a subregion pixels (= image points) which are situated outside the subregion, in particular on the block edge itself. A parameter which is characteristic of the activity in the subregion L is determined for each subregion $E(l)$ from the activity measure $A(l)$. By summing over all subregions of the block, a preliminary parameter P is calculated for the entire block from the parameters $P(l)$ characteristic of the subregions 1. Finally, the quantization parameter Q actually applied for a block is obtained from P, once again by scaling.

A quantization parameter Q determined in this way actually has the property of effecting a better adapted quantization in the previously described critical situations with a variously active image component. This means that with the aid of the process according to the invention in the case of blocks having a critical image content a relatively finer quantization is set in general than in accordance with the previously outlined, known processes.

The fact that the process according to the invention also does not worsen the local relationship between the data rate and image error can be rendered plausible as follows: The function $Q_O$ optimized for the local data rate and local image errors is now applied to smaller subregions instead of to an entire block, and even, in a preferred embodiment, to individual pixels with their adjacent pixels. The calculation according to the invention of the quantization parameter can then be understood as to the effect with respect to the data rate and image error simply as an averaging over a block region.

An advantage of the process according to the invention is its regularity. It consists of a repetition of a small number of simple operations. Because of the simple control structure bound up therewith, it is very well suited for realization with the aid of integrated circuits. In particular, the operations assigned to the subregions can also be carried out in parallel.

A further advantage of the process according to the invention is that this process can be inserted into existing coding processes such as are described, for example, in the article by W. Tengler, in a simple way to the effect that the changes required do not essentially complicate the overall process. For example, in the processes described in the article by W. Tengler, block-related sums A of absolute local differences such as are defined in formula (1) are used not only as an activity measure for adaptive quantization, but also as a change-over criterion between different modes of the coding process. In this case, one of the calculated parameters A is used not only for the changeover criteria, but simultaneously also as the activity measure for the adaptive quantization, so that this parameter need not be additionally calculated.

Advantageous developments of the present invention are as follows.

The activity measure is given by the relationship
$$A = \Sigma \left( |y(m,n+1) - y(m,n)| + |y(m+1,n) - y(m,n)| \right)$$

$$m, n \in E(1)$$

where m and n respectively denote indices of pixels within a subregion of an image block, and y denotes the image signal.

Discrete cosine transformation is used to transform the image regions to be transmitted.

The subregions of the blocks in each case have a pixel and its nearest adjacent pixel in the subsequent row or the subsequent column.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 2:
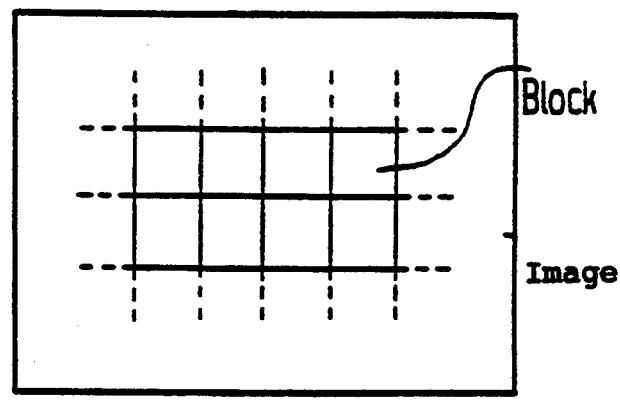
FIG. 2 shows the division of an image into blocks.
Figure 3:
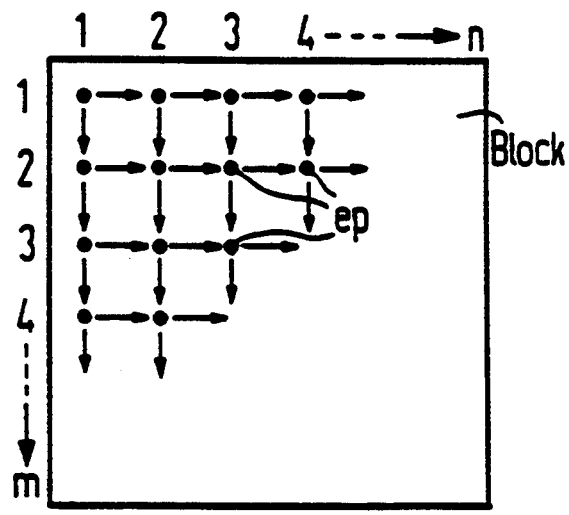
FIG. 3 shows the assembly of a block from pixels (ep) and the difference operations between adjacent pixels, indicated by arrows.
Figure 5:
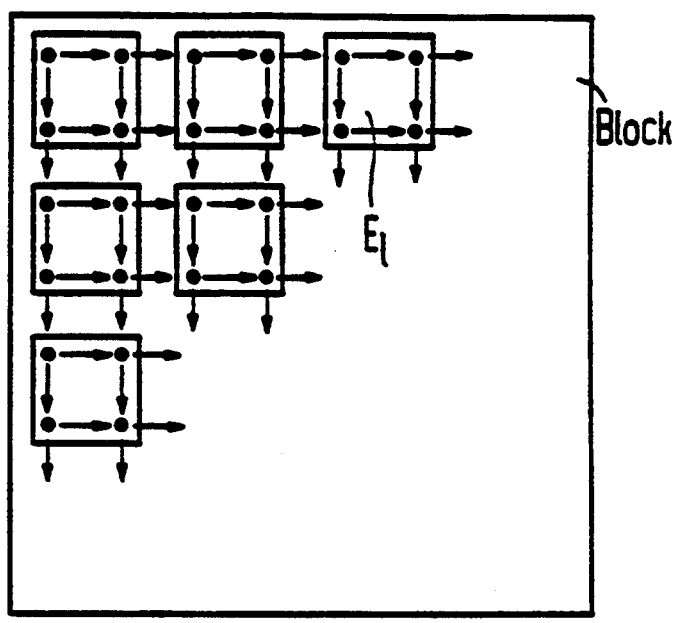
FIG. 5 shows the division of an image block into smaller subregions E(1).
Figure 6:
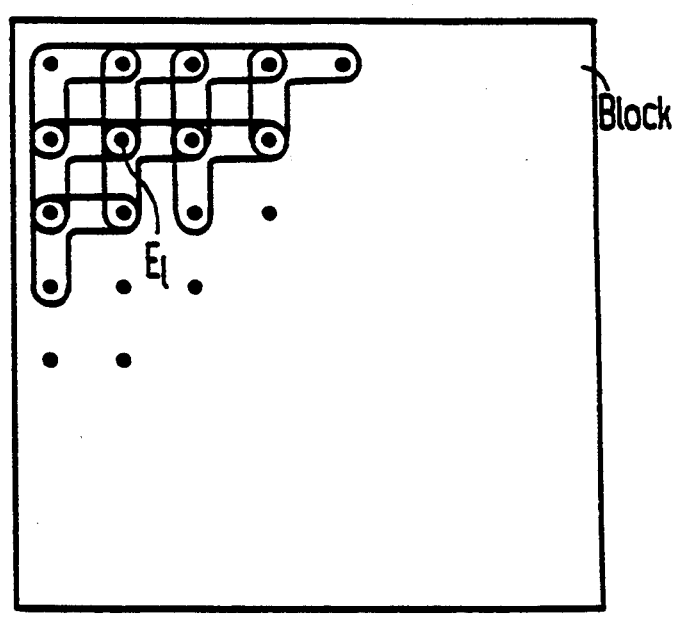
FIG. 6 shows the division of an image block into smaller subregions E(1) which comprise individual pixels and their nearest adjacent pixels.

In order to transmit an image or an element of an image sequence, the digital image to be transmitted is firstly divided into a number of blocks (FIG. 2). Each block comprises a number of pixels ep, as illustrated in FIG. 3. In order to carry out the process, each block is divided into smaller subregions E(1), where 1: =1, ... , L. In this case, each subregion E(1) generally comprises a plurality of adjacent pixels (FIG. 5). In a preferred embodiment of the invention, each subregion E(1) comprises a pixel and the two directly adjacent pixels of this pixel (FIG. 6) in the subsequent row and in the subsequent column, respectively.

Figure 7:
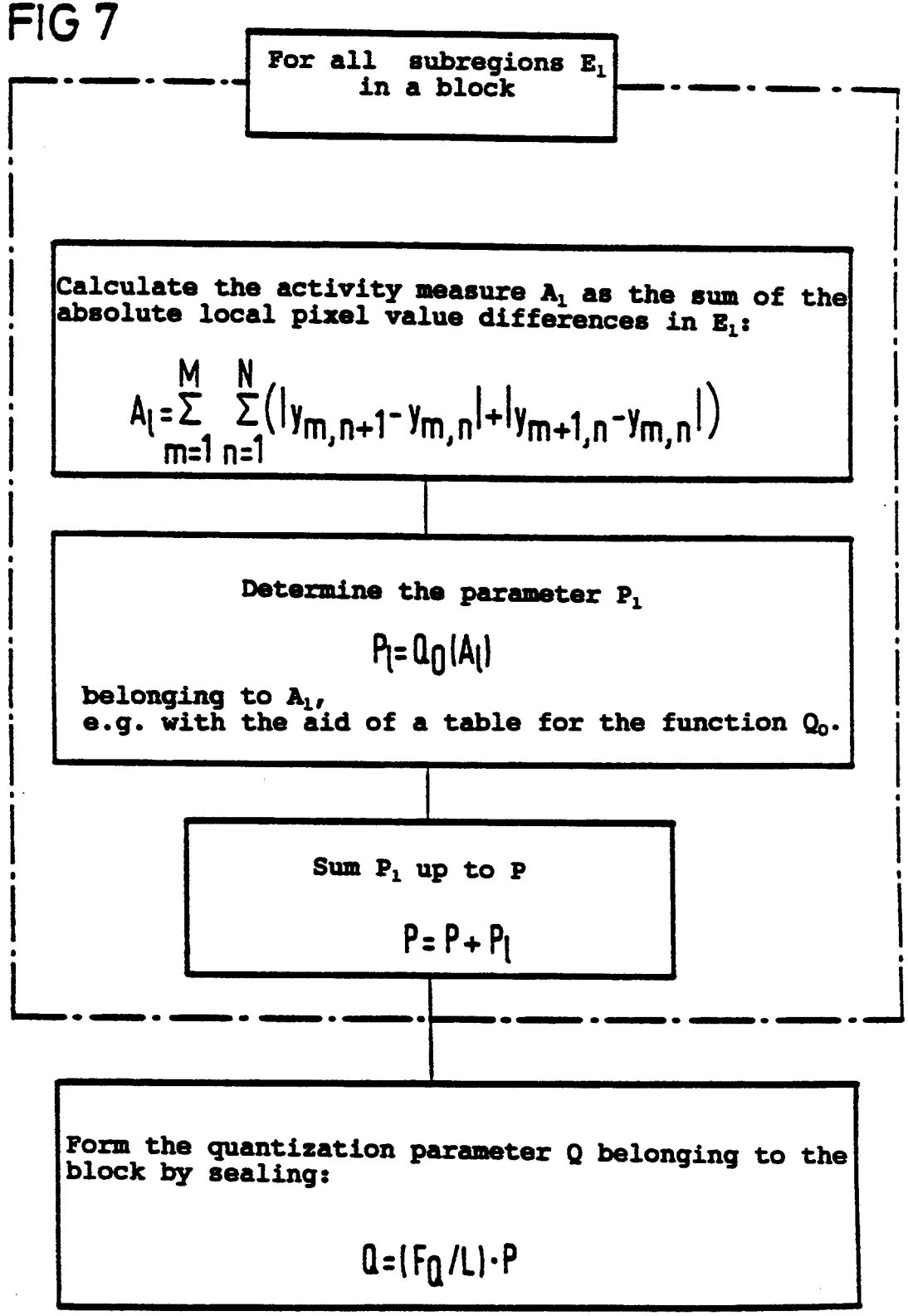
FIG. 7 is a flowchart depicting the signal flow of the method of the present invention.

FIG. 7 shows a signal flow plan of the process. The activity measure A defined in formula (3) is firstly calculated for all subregions E(1) of each block. For each subregion E(1), this activity measure A(1) is the sum of the absolute image signal differences of all the pixels in the subregion E(1). Because of its definition, this activity measure is 0 if the image signal is homogeneous in the relevant subregion E(1). If, by contrast, the image signal values vary strongly within a subregion E(1), the activity measure A(1) for this part region differs distinctly from 0, and thus is the stronger the stronger the variation in the image signal values within the subregion E(1). The activity measure A(1) determined for each subregion E(1) is now used as an aid for determining a parameter P(1) for said subregion, which is a function $Q_O$ of the activity A(1). This relationship is also reproduced in formula (2). The function $Q_O$ can advantageously be realized with the aid of a table which assigns the associated parameter to each possible value of the activity measure.

Figure 4:
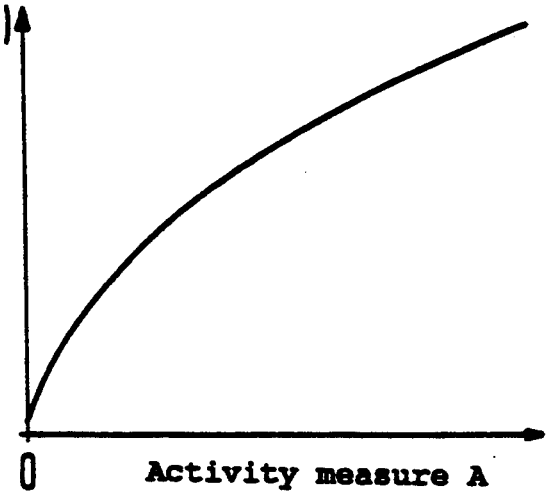
FIG. 4 shows the typical curve of a function $Q_O$ as a function of the activity measure A.

The function $Q_O$ is a suitably selected, preferably monotonically increasing, convex function of the activity measure A, which is preferably selected in such a way that its increase becomes smaller with larger values of the activity A. A typical curve of the function $Q_O$ is reproduced in FIG. 4 as a function of the activity measure A. The optimum selection of the function $Q_O$ depends on the properties of the image material to be transmitted and on the preferences of the user of the process with respect to the transmission characteristics and the image quality. Possible advantageous selections for the curve of a function $Q_O$ follow, for example, from the publication by W. Tengler 1990.

By summing the parameters P(1) of all subregions E(1), a parameter P characteristic of the activity of the relevant block is obtained in a further step of the process. This parameter P now yields directly for each block the associated quantization parameter Q with the aid of the scaling $$(4) \quad Q = (F_Q/L) \cdot P$$

The parameter Q is therefore calculated from the parameter P in a completely analogous fashion to known processes, although because of the summation over L subregions must be divided by L when calculating the parameter P using this scaling. This is taken into account in formula (4).

Figure 1A:
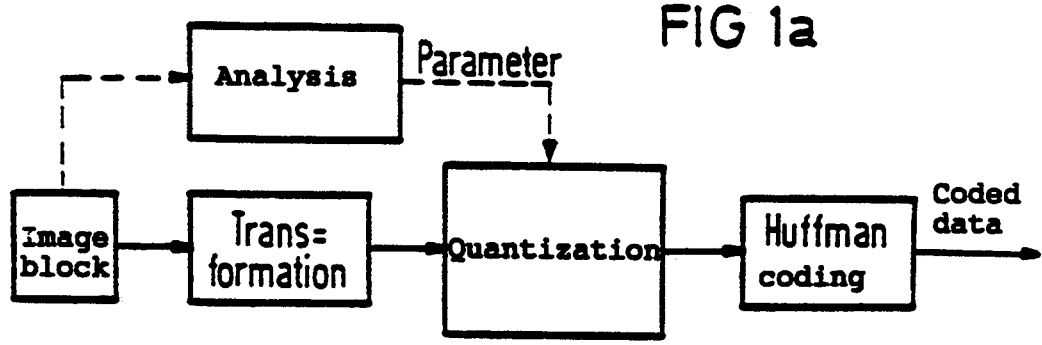
FIG 1a shows the signal flow diagram of a transformation coding process with adaptive quantization, the quantization parameter being obtained with the aid of an image block analysis.
Figure 1B:
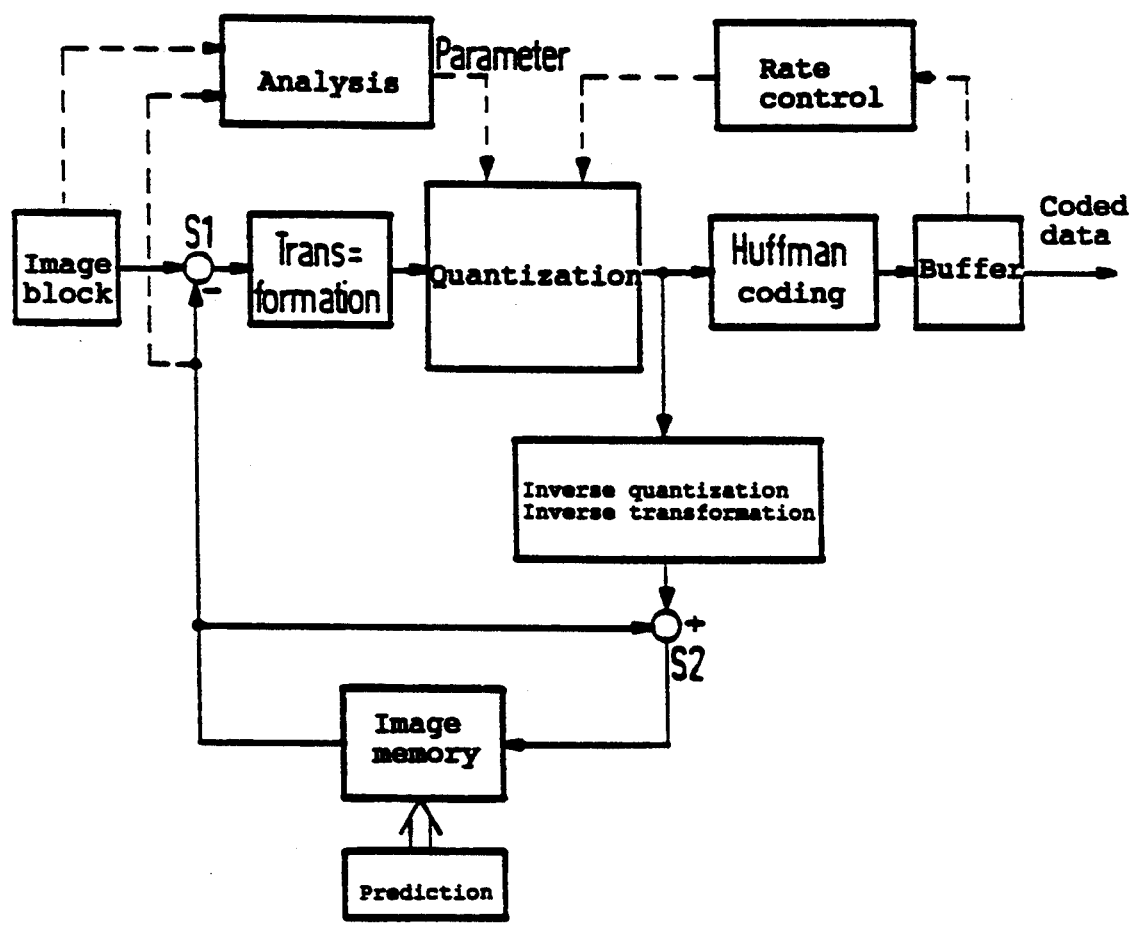
FIG. 1b shows the signal flow plan of a differential pulse code modulation process for image coding with the inclusion of a blockwise transformation.

It is a particular advantage of the process described here that with its aid a quantization parameter is found for each image block in a way customary from the prior art by analyzing image blocks. For this reason, the interface of the analysis process is unchanged relative to the other coding process. As a result, this process can be used without any problem in conjunction with known coding processes (FIG. 1a, FIG. 1b).

On the other hand, the process described here can be used to obtain a substantially more detailed analysis of the image content of an image block than is the case with the processes known from the prior art. As a result, the quantization parameter Q determined with the aid of the process described here corresponds better than in the case of the known processes to the actual activity of the image signal in an image block. Finally, the process according to the invention thus permits the transmission of any image block at the data rate adapted to it. This is also the case, in particular, when the image block to be transmitted comprises particularly active and particularly inactive regions.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A process for adaptive quantization for the purpose of data reduction in the transmission of digital images, comprising the steps of: a) subdividing an image region to be transmitted into a multiplicity of blocks; b) subdividing each block into subregions E(1), where $1=1, \ldots, L$; c) determining an activity measure A(1) for each subregion E(1); d) determining a subregion parameter P(1) for each subregion E(1) from the activity measure A(1) using a function $Q_O$ in accordance with the relationship $P(1)=Q_O(A(1))$, e) calculating a block parameter P by summing over all the subregions E(1) of each block only after using the function $Q_O$ for each subregion E(1), the block parameter being calculated in accordance with the relationship $$P = \sum_l P(l)$$

and being characteristic of each block, f) determining a quantization parameter $$Q=(F_Q/L) \cdot P$$

for each block from the block parameter P and using a scaling factor $F_Q$, g) subjecting the image region to be transmitted in blockwise fashion to a transformation, transformation coefficients being determined which are quantized for each block as a function of the value of the quantization parameter Q belonging to the respective block, and h) transmitting the transformed image region.

2. The process as claimed in claim 1, wherein the activity measure is given by the relationship $$A=\Sigma(/y(m,n+1)-y(m,n)/+/y(m+1,n)-y(m,n)/)$$

$$m,n \in E(1)$$

where m and n respectively are indices of pixels within a subregion of a block of the image region, and y is an image signal of the image region.

3. The process as claimed in claim 1, wherein discrete cosine transformation is used to transform the image regions to be transmitted.

4. The process as claimed in claim 1, wherein each of the blocks has a plurality of pixels arranged in columns and rows and wherein each of the subregions of the blocks comprise a pixel and its nearest adjacent pixel in a subsequent row and its nearest adjacent pixel in a subsequent column.

5. A process for adaptive quantization for the purpose of data reduction in the transmission of digital images, comprising the steps of: a) providing an image region to be transmitted and subdividing the image region to be transmitted into a multiplicity of blocks; b) subdividing each block into subregions E(1), where $1=1, \ldots, L$; c) determining an activity measure A(1) for each subregion E(1); d) determining a subregion parameter P(1) for each subregion E(1) from the activity measure A(1) using a function $Q_O$ in accordance with the relationship $P(1)=Q_O(A(1))$, e) calculating a block parameter P by summing over all the subregions E(1) of each block only after using the function $Q_O$ for each subregion E(1), the block parameter being calculated in accordance with the relationship $$P = \sum_l P(l)$$

and being characteristic of each block, f) determining a quantization parameter $$Q=(F_Q/L) \cdot P$$

for each block from the block parameter P and using a scaling factor $F_Q$, g) subjecting the image region to be transmitted in blockwise fashion to a transformation, transformation coefficients being determined which are quantized for each block as a function of the value of the quantization parameter Q belonging to the respective block, wherein the quantized transformation coefficients represent a reduction of data relative to the image region to be transmitted, and h) transmitting the image region with the reduced data.

6. The process as claimed in claim 5, wherein the activity measure is given by the relationship $$A=\Sigma(/y(m,n+1)-y(m,n)/+/y(m+1,n)-y(m,n)/)$$

$$m,n \in E(1)$$

where m and n respectively are indices of pixels within a subregion of a block of the image region, and y is an image signal of the image region.

7. The process as claimed in claim 5, wherein discrete cosine transformation is used to transform the image regions to be transmitted.

8. The process as claimed in claim 5, wherein each of the blocks has a plurality of pixels arranged in columns and rows and wherein each of the subregions of the blocks comprise a pixel and its nearest adjacent pixel in a subsequent row and its nearest adjacent pixel in a subsequent column.

* * * * *